United States Patent
Peiris et al.

(10) Patent No.: US 10,044,403 B1
(45) Date of Patent: Aug. 7, 2018

(54) APPARATUS AND METHOD FOR MULTI-BEAM INITIAL SYNCHRONIZATION FOR 5G-NR SYSTEM

(71) Applicant: Samsung Electronics Co., Ltd., Gyeonggi-do (KR)

(72) Inventors: Bemini Hennadige Janath Peiris, San Diego, CA (US); Hongbing Cheng, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/666,275

(22) Filed: Aug. 1, 2017

Related U.S. Application Data

(60) Provisional application No. 62/501,294, filed on May 4, 2017.

(51) Int. Cl.
| | |
|---|---|
| *H04B 1/00* | (2006.01) |
| *H04B 1/709* | (2011.01) |
| *H04B 1/7073* | (2011.01) |
| *H04B 7/0413* | (2017.01) |

(52) U.S. Cl.
CPC ........... *H04B 1/709* (2013.01); *H04B 1/7073* (2013.01); *H04B 7/0413* (2013.01)

(58) Field of Classification Search
CPC ......... H04B 1/707; H04B 1/69; H04L 7/0008; H04L 7/02
USPC ................................................ 375/150, 354
See application file for complete search history.

(56) References Cited

U.S. PATENT DOCUMENTS

| | | | |
|---|---|---|---|
| 5,506,861 A | 4/1996 | Bottomley | |
| 6,683,924 B1 | 1/2004 | Ottosson et al. | |
| 7,095,814 B2 * | 8/2006 | Kyeong | H04B 7/01 375/148 |

(Continued)

FOREIGN PATENT DOCUMENTS

EP         1 107 483        6/2001

OTHER PUBLICATIONS

Ramy Salahat, Ehab Salahat, Ali Hakam and Tasneem Assaf, "A Simple and Efficient Approximation to the Modified Bessel Functions and Its Applications to Rician Fading".

(Continued)

*Primary Examiner* — Khai Tran
(74) *Attorney, Agent, or Firm* — The Farrell Law Firm, P.C.

(57) ABSTRACT

An apparatus, a method, a method of manufacturing and apparatus, and a method of constructing an integrated circuit are provided. The apparatus includes a correlator; a buffer connected to the correlator, including a plurality of buffer components; a combiner array, including a plurality of combiners, wherein each of the plurality of combiners includes a plurality of buses, wherein each bus is connected to one buffer component corresponding to a synchronization signal block for each synchronization signal block; and a selector connected to each of the plurality of combiners, where the selector is configured to apply a pre-determined function to the plurality of combiners corresponding to the synchronization signal blocks, determine a maximum of applying the pre-determined function, and determine that a primary spreading sequence (PSS) is detected at a time corresponding to a time associated with the maximum of applying the pre-determined function.

16 Claims, 4 Drawing Sheets

(56) References Cited

U.S. PATENT DOCUMENTS

| | | | |
|---|---|---|---|
| 7,123,647 B1 * | 10/2006 | Sheng | H04B 1/70754 375/150 |
| 7,778,370 B2 | 8/2010 | Aytur et al. | |
| 9,106,499 B2 | 8/2015 | Zeng et al. | |
| 2005/0185743 A1 | 8/2005 | Li | |
| 2016/0087707 A1 | 3/2016 | Guey et al. | |

OTHER PUBLICATIONS

2013 IEEE GCC Conference Nov. 17-20, 2013, pp. 351-354.
D. Parker, "Phased arrays—Part 1: Theory and Architectures", IEEE Transactions on Microwave Theory and Techniques, vol. 50, Issue: 3, Mar. 2002, pp. 678-687.
Gabriel Brown, "Exploring the Potential of mmWave for 5G Mobile Access", Qualcomm, www.qualcomm.com, Jun. 2016, pp. 1-12.
3GPP TSG RAN WG1 Meeting #86b Lisbon, Portugal Oct. 10-14, 2016 Agenda item: 8.1.5.1, "WF on the unified structure of DL sync signal", Intel Corporation, NTT DOCOMO, ZTE.
ZTE, Microelectronics, ETRI, InterDigital.

* cited by examiner

US 10,044,403 B1

APPARATUS AND METHOD FOR MULTI-BEAM INITIAL SYNCHRONIZATION FOR 5G-NR SYSTEM

PRIORITY

This application claims priority under 35 U.S.C. § 119(e) to a U.S. Provisional Patent Application filed on May 4, 2017 in the United States Patent and Trademark Office (USPTO) and assigned Ser. No. 62/501,294, the entire contents of which are incorporated herein by reference.

FIELD

The present disclosure relates generally to wireless communications systems, and more particularly, to an apparatus and method for multi-beam initial synchronization for a fifth generation new radio (5G-NR) system.

BACKGROUND

The $5^{th}$ generation (5G) mobile network is proposed as the next telecommunications standard beyond the current $4^{th}$ generation (4G) standard. In particular, 5G-NR is part of a continuous mobile broad evolution process to meet the requirements of 5G. 5G-NR aims to provide better levels of latency, reliability, and security, to enable the connectivity of a massive number of Internet of Things (IoT) devices and other types of mission-critical services.

A major challenge of using millimeter wave (mmWave) for 5G access is to establish a link between a base station and a user equipment (UE) amidst higher path loss and rapidly changing channel conditions between the base station and the UE. At mmWave frequencies, a small variation in the environment can change the condition of a channel and affect receiver performance. Analog beam sweeping and beam tracking techniques are needed in massive multiple input multiple output (MIMO) systems to create highly directed beams that facilitate establishing a proper link between a base station and a UE. Beam steering is needed for initial access where a reliable link is established between a base station and a UE. Once a link is established, a beam tracking technique is required to maintain the link between a base station and a UE. Otherwise, at mmWave frequencies, due to environmental changes, received signal strength may be reduced significantly leading to a disconnection of the link between a base station and a UE.

NR has proposed forming a synchronization (sync) signal block by concatenating a physical broadcast channel (PBCH), a secondary spreading sequence (SSS), and a primary spreading sequence (PSS). While the format of the synchronization signal block has not been determined, different proposals for the arrangement of the synchronization sub-blocks have been suggested.

SUMMARY

According to one embodiment, an apparatus includes a correlator, including a first input configured to receive a locally generated PSS, a second input configured to receive an input signal $z_i$ at an $i^{th}$ time index, and an output configured to output $y_{l,k}$, a beamforming gain $g_k$ and a phase $\theta_k$, and noise $\sigma_k$, where $y_{l,k}$ is an $l^{th}$ time instant of a kth synchronization signal block period, and i, l, and k, are integers; a buffer connected to the output of the correlator, including a plurality of buffer components configured to store each $y_{l,k}$ corresponding to a plurality of synchronization signal blocks; a combiner array, including a plurality of combiners, wherein each of the plurality of combiners includes a plurality of buses, wherein each bus is connected to one buffer component corresponding to a synchronization signal block for each synchronization signal block, and an output; and a selector connected to an output of each of the plurality of combiners, and an output, wherein the selector is configured to apply a pre-determined function $f$ to the outputs of the plurality of combiners corresponding to each of the synchronization signal blocks, determine a maximum of applying the pre-determined function $f$, and determine that a PSS is detected at a time corresponding to a time associated with the maximum of applying the pre-determined function $f$.

According to one embodiment, a method includes receiving, by a correlator, a synchronization signal sample; correlating, by the correlator, the synchronization sample with a locally generated primary spreading sequence, wherein the correlator includes an output $y_{l,k}$ that is an $l^{th}$ time instant of a kth synchronization signal block period, and l and k are integers; computing, by a combiner array, noise $\sigma_k$, beamforming gain $g_k$, and phase $\theta_k$ for each synchronization signal block in the synchronization sample; computing, by the combiner array, a combining function $f$ on results of the correlation of the synchronization signal sample and the noise $\sigma_k$, the beamforming gain $g_k$, and the phase $\theta_k$ for each synchronization signal block in the synchronization signal sample; identifying a result of the combining function $f$ as a maximum combining function value if the result of the combining function $f$ is either an initial result of the combining function $f$ or is greater than an immediately preceding result of the combining function $f$; if an end of an observation window is not reached, returning to the step of receiving the synchronization signal sample, otherwise, proceeding to the next step; and determining, by a selector, that a PSS is detected and a time corresponding to the maximum combining function value is a detection time of the PSS.

According to one embodiment, a method of manufacturing an apparatus includes forming the apparatus on a wafer or a package with at least one other apparatus, wherein the apparatus includes a correlator, a buffer, a combiner array, and a selector, wherein the correlator includes an output $y_{l,k}$ that is an $l^{th}$ time instant of a kth synchronization signal block period, l, and k, are integers, and the selector includes a combining function $f$ applied to a beamforming gain $g_k$, a phase $\theta_k$, noise $\sigma_k$, and the outputs $y_{l,k}$ of the correlator for each synchronization signal block in a synchronization signal sample, and testing the apparatus, wherein testing the coarse timing and frequency synchronization apparatus includes testing the apparatus using one or more electrical to optical converters, one or more optical splitters that split an optical signal into two or more optical signals, and one or more optical to electrical converters.

According to one embodiment, a method of constructing an integrated circuit includes generating a mask layout for a set of features for a layer of the integrated circuit, wherein the mask layout includes standard cell library macros for one or more circuit features that include an apparatus that includes a correlator, a buffer, a combiner array, and a selector, wherein the correlator includes an output $y_{l,k}$ that is an $l^{th}$ time instant of a kth synchronization signal block period, l, and k, are integers, and the selector includes a combining function $f$ applied to a beamforming gain $g_k$, a phase $\theta_k$, noise $\sigma_k$, and the outputs $y_{l,k}$ of the correlator for each synchronization signal block in a synchronization signal sample; disregarding relative positions of the macros for compliance to layout design rules during the generation of the mask layout; checking the relative positions of the macros for compliance to layout design rules after generating the mask layout; upon detection of noncompliance with the layout design rules by any of the macros, modifying the mask layout by modifying each of the noncompliant macros to comply with the layout design rules; generating a mask according to the modified mask layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
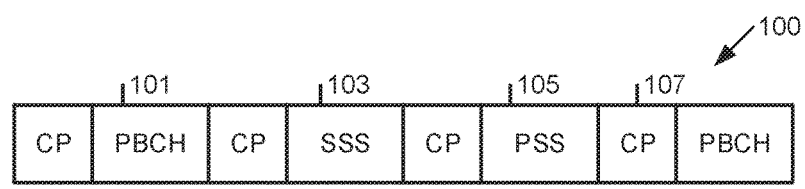
FIG. 1 illustrates a synchronization signal block, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

The present disclosure concerns an apparatus and a method for multi-beam initial synchronization for a 5G-NR system.

FIG. 1 illustrates a synchronization signal block 100, according to one embodiment. The synchronization signal block 100 includes at least one PBCH 101, an SSS 103, a PSS 105, and a cyclic prefix (CP) 107.

Referring to FIG. 1, the format of the synchronization signal block 100 is in the form of PBCH/SSS/PSS/PBCH. However, the present disclosure is not limited thereto. Other synchronization signal block formats, such as PSS/PBCH/PBCH/SSS and PBCH/PSS/SSS/PBCH, may be used without deviating from the scope of the present disclosure.

Each synchronization signal block 100 is beam formed with a certain beam pattern selected from a transmitter (TX) codebook. The plurality of synchronization signal blocks 100 are repeated multiple times. A receiver must identify a PSS 105 to obtain correct timing and a cell group identifier (ID).

Figure 2:
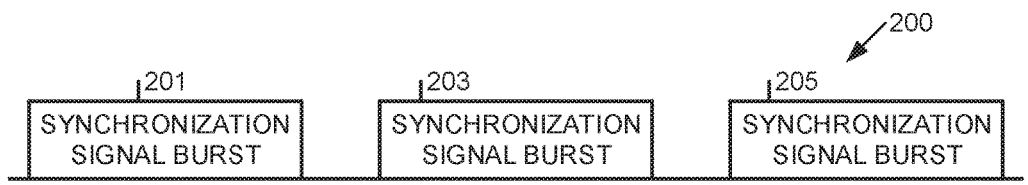
FIG. 2 illustrates a set of bursts of synchronization signal blocks, according to one embodiment.

FIG. 2 illustrates a plurality of burst sets 200 of synchronization signal bursts 201, 203, and 205, according to one embodiment.

Referring to FIG. 2, a plurality of synchronization signal blocks 100 shown in FIG. 1 are concatenated to form the plurality of burst sets 200 that includes synchronization signal bursts 201, 203, and 205 shown in FIG. 2, wherein the synchronization signal blocks 100 may be consecutive or not, wherein synchronization blocks 100 may be combined within a burst or across bursts, and wherein the plurality of burst sets 200 contains multiple synchronization signal blocks 100.

In a 5G-NR system, due to TX beam steering, the power of a received PSS may vary significantly from one synchronization signal block to another. The present disclosure provides reliable timing estimation through a combination of a plurality of synchronization signal blocks, assuming that channel gain information and noise variance information are available at the receiver. The channel gain may not necessarily be required to be the absolute gain observed by the receiver. Instead, a relative gain among synchronization signal blocks may be used for combining a plurality of synchronization signal blocks. The present disclosure may further determine channel gain and estimate noise from a received signal.

According to one embodiment, the present disclosure determines a sliding window cross correlator output, for each time instant, for each synchronization signal block 100 of FIG. 1, over a plurality of burst sets 200 of synchronization signal bursts 201, 203, and 205 of FIG. 2. For each time instant, the present disclosure combines correlator outputs over a plurality of burst sets 200 of synchronization signal bursts 201, 203, and 205 and selects a timing corresponding to the maximum combined value as a desired PSS timing. In the presence of a plurality of synchronization signal blocks, it is desirable to combine the plurality of synchronization signal blocks using a combining function $f$ to improve the reliability of estimating PSS synchronization timing. Various combining functions $f$ are described below. A beamforming gain and phase of each combining block may be assumed to be different, where combining function $f$ variables $g_k$ and $\sigma_k$ for gain and noise, respectively, may be estimated from received samples.

Figure 3:
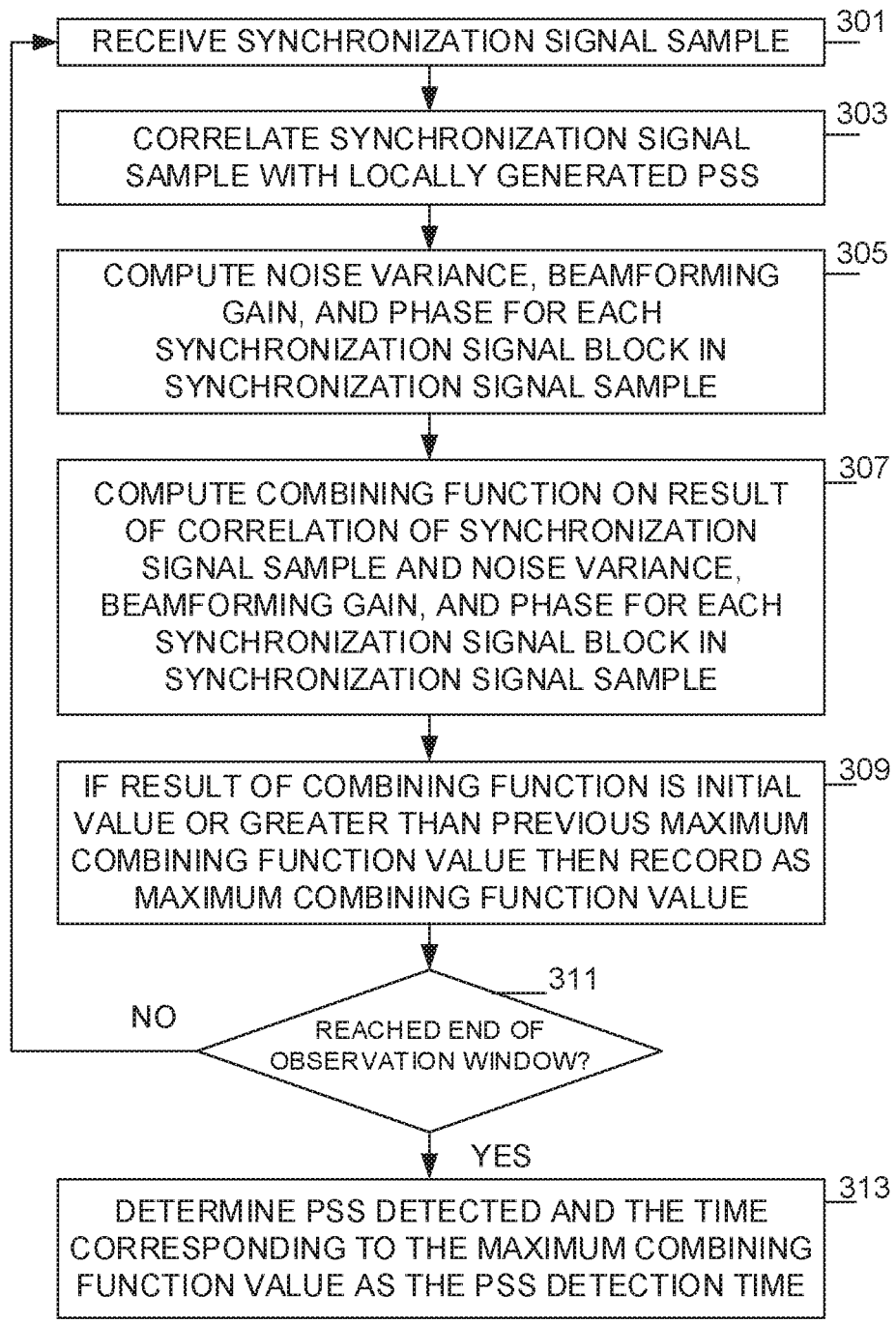
FIG. 3 is a flowchart of a method of determining a primary spreading sequence (PSS) timing index for a 5G-NR system, according to one embodiment.

FIG. 3 is a flowchart of a method of determining a PSS timing index for a 5G-NR system, according to one embodiment.

Referring to FIG. 3, a synchronization signal sample is received at 301.

At 303, the received synchronization signal sample is correlated with a locally generated PSS. The results of the correlation may be stored in a buffer.

At 305, a noise variance, a beamforming gain, and a phase for each synchronization signal block in the synchronization signal sample is computed.

At 307, a combining function is computed on the result of the correlation of the synchronization signal sample and the noise variance, the beamforming gain, and the phase for each synchronization signal block in the synchronization signal sample.

At 309, if the result of the combining function is an initial value or a value that is greater than a previous maximum combining function value then the result of the combining function is recorded as the maximum combining function value.

At 311, if an end of an observation window for the synchronization signal is not reached then the process returns to 301 to receive another sample from the synchronization signal. Otherwise, the process proceeds to 313.

At 313, it is determined whether the PSS is detected, and whether the time corresponding to the PSS is the maximum combining function value as the detection time of the PSS.

Figure 4:
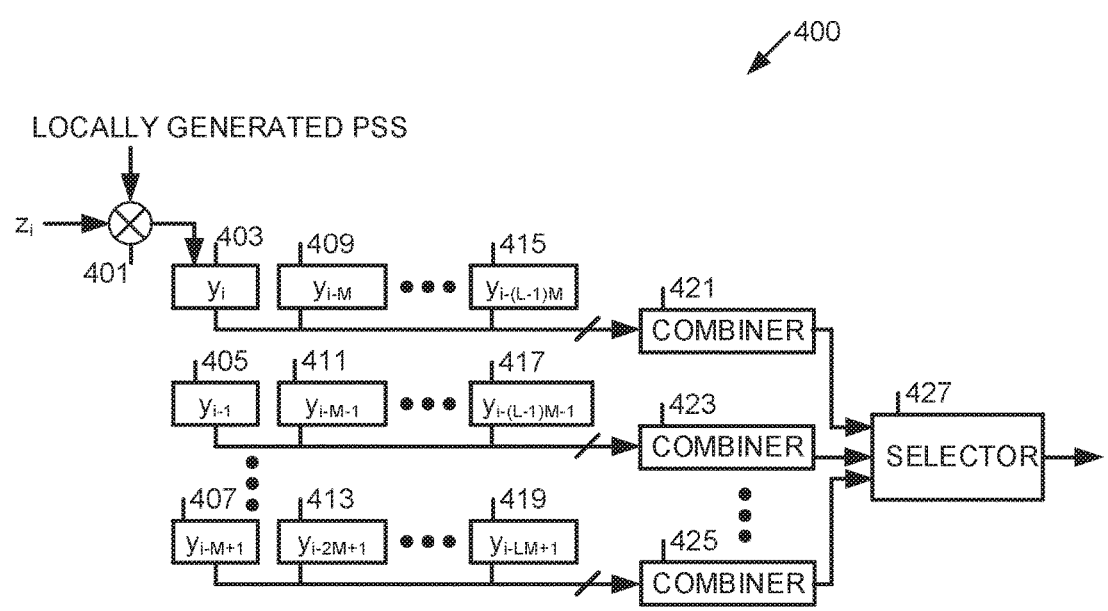
FIG. 4 is a block diagram of an apparatus for determining a PSS timing index for a 5G-NR system, according to one embodiment.

FIG. 4 is a block diagram of an apparatus 400 for determining a PSS timing index for a 5G-NR system, according to one embodiment.

Referring to FIG. 4, the apparatus 400 includes a correlator 401, buffer components 403, 405, 407, 409, 411, 413, 415, 417, and 419, combiner array components 421, 423, and 425, and a selector 427.

The correlator 401 includes a first input for receiving a locally generated PSS, a second input for receiving an input signal $z_i$ at an $i^{th}$ time index, and an output. The output $y_{l,k}$ of the correlator 401 is at an $l^{th}$ time instant of a kth synchronization signal block, a beamforming gain $g_k$ and a phase $e^{j\theta_k}$ of the receiver observed, and a noise variance is $\sigma_k^2$.

The buffer components 403, 405, and 407 store correlation results for a most recent synchronization signal block, while buffer components 409, 411, and 413 store correlation results for a previous synchronization signal block, and buffer components 415, 417, and 419 store correlation results for a first synchronization signal block.

The combiner array components 421, 423, and 425 each include an input bus connected to one register array element in a corresponding row among each of the synchronization signal blocks stored in the register array elements and an output. That is, combiner array element 421 includes an input bus connected to the outputs of buffer components 403, 409, and 415, combiner array element 423 includes an input bus connected to the outputs of buffer components 405, 411, and 417, and combiner array element 425 includes an input bus connected to the outputs of buffer components 407, 413, and 419.

The selector 427 includes a plurality of inputs, and an output. Each of the plurality of inputs of the selector 427 is connected to an output of a combiner in the combiner array 421, 423, and 425. The selector 427 selects a combining function $f$ to be applied to the outputs of the combiner array 421, 423, and 425.

In one embodiment, a timing index I is expressed in Equation (1) as follows:

$$\hat{l} = \max_{l \in ss\_block} \sum_{k=0}^{L-1} f(g_k, \theta_k, \sigma_k, y_{k,l}) \quad (1)$$

The number of synchronization signal blocks to be combined is L.

According to one embodiment, the combining function $f$ that provides good synchronization detection performance under the assumption that $g_k$ and $\alpha_k$ may be estimated from received samples and $e^{j\theta_k}$ may be assumed to be uniformly distributed is as expressed in Equation (2) as follows:

$$f(g_k, \theta_k, \sigma_k, y_{k,l}) = \log\left(I_0\left(\frac{Ng_k}{\sigma_k^2}|y_{k,l}|\right)\right) \quad (2)$$

where a zero$^{th}$ order $I_0$ is a modified Bessel function and N is an integer representing a length of a PSS.

According to one embodiment, for low operating signal-to-noise ratio (SNR), the combining function $f$ may be as Expressed in Equation (3) as follows:

$$f(g_k, \theta_k, \sigma_k, y_{k,l}) = \left(\frac{g_k}{\sigma_k^2}|y_{k,l}|\right)^2 \quad (3)$$

According to one embodiment, the combining function $f$, assuming that the phase $\theta_k$ and amplitude $g_k$ of the received signal may be estimated, is expressed in Equation (4) as follows:

$$f(g_k, \theta_k, \sigma_k, y_{k,l}) = \frac{g_k}{\sigma_k^2}|y_{k,l}| \quad (4)$$

According to one embodiment, the combining function $f$, assuming that phase $\theta_k$ and amplitude $g_k$ of the received signal may be estimated from received samples, and noise is constant across a synchronization signal burst may be expressed in Equation (5) as follows:

$$f(g_k, \theta_k, \sigma_k, y_{k,l}) = g_k|y_{k,l}| \quad (5)$$

According to one embodiment, assuming that phase $g_k e^{j\Theta_k}$ is an unknown parameter that may be estimated with the received samples and noise is constant across a synchronization signal burst, the combining function $f$ may be expressed in Equation (6) as follows:

$$f(g_k,\theta_k,\sigma_k,y_{k,l})=|y_{l,k}|^2 \quad (6)$$

According to one embodiment, the combining function $f$, assuming a weighting factor as SNR, may be expressed in Equation (7) as follows:

$$f(g_k, \theta_k, \sigma_k, y_{k,l}) = \frac{|g_k|^2}{\sigma_k^2}|y_{l,k}| \quad (7)$$

According to one embodiment, if a receiver has no knowledge of beamforming gain $g_k$ or phase $\theta_k$, the combining function $f$ may be expressed in Equation (8) as follows:

$$f(g_k,\theta_k,\sigma_k,y_{k,l})=|y_{k,l}| \quad (8)$$

According to one embodiment, the apparatus 400 passes the input signal $z_i$ into the correlator 401 (or searcher) that correlates the input signal $z_i$ with a locally generated PSS. The output $y_i$ of the correlator 401 is stored in the buffer components 403, 405, 407, 409, 411, 413, 415, 417, and 419 with dimensions $ss_{block}L$. A noise variance $\sigma_k^2$, a beamforming gain $g_k$ and $\theta_k$ for each entry of the buffer $y_{l,k}$ is determined. Estimates of the above-identified parameters may not be required as described below. In one embodiment, $$\sum_{k=0}^{L-1} f(g_k, \theta_k, \sigma_k, y_{k,l})$$

is determined. A synchronization timing $\hat{l}$ may be determined as $$\hat{l} = \max_{l \in ss\_block} \sum_{k=0}^{L-1} f(g_k, \theta_k, \sigma_k, y_{k,l}).$$

According to one embodiment, noise and gain estimates are provided. In Equation (9) above, the cross correlator output at an ith time instant may be expressed in Equation (9) as follows:

$$y_i = \frac{e^{j\theta_k} g_k c^H x_i}{N} + n_i \quad (9)$$

If a correlation peak occurs, the correlator output $y_i$ may be expressed in Equation (10) as follows:

$$y_i = \frac{e^{j\theta_k} g_k c^H c}{N} + n_i \quad (10)$$

which simplifies to $y_i = e^{j\theta_k} g_k R(0) + n_i$. Thus, Equation (11) may be expressed as follows:

$$|y_i|^2_{peak} = g_k^2 + \frac{\sigma^2}{N} \quad (11)$$

If the correlator output $y_i$ is observed to be relatively far away from the peak, Equation (12) may be expressed as follows:

$$|y_i|^2_{i \gg peak} = \frac{g_k^2}{N} + \frac{\sigma^2}{N} \quad (12)$$

From Equations (11) and (12) above, the noise variance and channel gain may be estimated and expressed in Equations (13) and (14) as follows:

$$\sigma_k^2 = \frac{N-1}{N}\left(|y_i|^2_{i \gg peak} - \frac{|y_i|^2_{peak}}{N}\right) \quad (13)$$

$$g_k^2 = \frac{N-1}{N}(|y_i|^2_{peak} - |y_i|^2_{i \gg peak}) \quad (14)$$

Noise may be calculated by observing a window that is two fast Fourier transform (FFT) symbols away from detected peaks and according to a frame format as described in FIG. 1. The observation window may be within the first PBCH symbol.

According to one embodiment, if there is a carrier frequency offset (FO) between the transmitter and the receiver, the combining function $f$ for both different timing and frequency hypotheses may be evaluated and the desired PSS timing may be the time hypothesis corresponding to the maximum value of the combining function $f$ evaluated over all of the considered timing and the frequency hypotheses.

According to one embodiment, combining multiple synchronization signal blocks may include determining a sliding window cross correlator output, for each time instant, for each synchronization signal block, over multiple synchronization signal bursts; combining, for each time instant, the correlator outputs over multiple bursts; and selecting the timing corresponding to the maximum combined value as the PSS timing.

Figure 5:
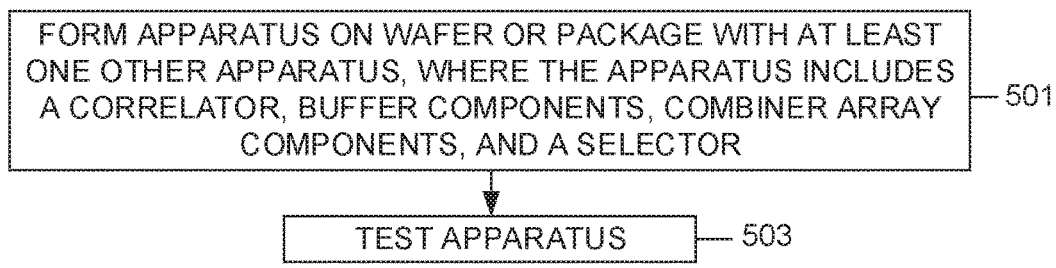
FIG. 5 illustrates an exemplary flowchart of a method of manufacturing an apparatus for determining a PSS timing index for a 5G-NR system, according to one embodiment.

FIG. 5 illustrates an exemplary flowchart of a method of manufacturing an apparatus for determining a PSS timing index for a 5G-NR system, according to one embodiment.

Referring to FIG. 5, an apparatus is formed on a wafer or a package with at least one other apparatus, where the apparatus includes a correlator, buffer components, combiner components, and a selector, at 501.

At 503, the apparatus is tested. Testing the apparatus may include testing the apparatus using one or more electrical to optical converters, one or more optical splitters that split an optical signal into two or more optical signals, and one or more optical to electrical converters.

Figure 6:
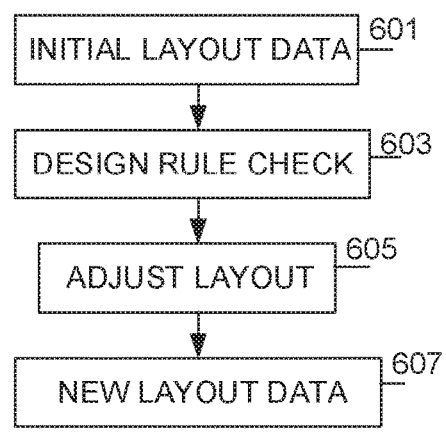
FIG. 6 illustrates an exemplary flowchart of a method of constructing an integrated circuit, according to one embodiment.

FIG. 6 illustrates an exemplary flowchart of a method of constructing an integrated circuit, according to one embodiment.

Referring to FIG. 6, initial layout data is constructed in 601. For example, a mask layout is generated for a set of features for a layer of the integrated circuit, wherein the mask layout includes standard cell library macros for one or more circuit features that include an apparatus that includes a correlator, buffer components, combiner components, and a selector, and disregarding relative positions of the macros for compliance to layout design rules during the generation of the mask layout.

At 603, a design rule check is performed. For example, the method may check the relative positions of the macros for compliance to layout design rules after generating the mask layout.

At 605, the layout is adjusted. For example, the method, upon detection of noncompliance with the layout design rules by any of the macros, may modify the mask layout by modifying each of the noncompliant macros to comply with the layout design rules.

At 607, new layout data is generated. For example, the method may generate a mask according to the modified mask layout with the set of features for the layer of the integrated circuit. Then, the integrated circuit layer according to the mask may be manufactured.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
   a correlator, including a first input configured to receive a locally generated primary spreading sequence (PSS), a second input configured to receive an input signal $z_i$ at an $i^{th}$ time index, and an output configured to output $y_{l,k}$, a beamforming gain $g_k$ and a phase $\theta_k$, and noise $\sigma_k$, where $y_{l,k}$ is an $l^{th}$ time instant of a kth synchronization signal block period, and i, l, and k, are integers;
   a buffer connected to the output of the correlator, including a plurality of buffer components configured to store each $y_{l,k}$ corresponding to a plurality of synchronization signal blocks;
   a combiner array, including a plurality of combiners, wherein each of the plurality of combiners includes a plurality of buses, wherein each bus is connected to one buffer component corresponding to a synchronization signal block for each synchronization signal block, and an output; and
   a selector connected to an output of each of the plurality of combiners, and an output, wherein the selector is configured to apply a pre-determined function $f$ to the outputs of the plurality of combiners corresponding to each of the synchronization signal blocks, determine a maximum of applying the pre-determined function $f$, and determine that a PSS is detected at a time corresponding to a time associated with the maximum of applying the pre-determined function $f$.

2. The apparatus of claim 1, wherein the pre-determined function $f$ is $$f(g_k, \theta_k, \sigma_k, y_{k,l}) = \log\left(I_0\left(\frac{Ng_k}{\sigma_k^2}|y_{k,l}|\right)\right)$$

where $I_0$ is a zero$^{th}$ order of a modified Bessel function and N is an integer representing a length of the PSS.

3. The apparatus of claim 1, wherein the pre-determined function $f$ is $$f(g_k, \theta_k, \sigma_k, y_{k,l}) = \left(\frac{g_k}{\sigma_k^2}|y_{k,l}|\right)^2.$$

4. The apparatus of claim 1, wherein the pre-determined function $f$ is $$f(g_k, \theta_k, \sigma_k, y_{k,l}) = \frac{|g_k|^2}{\sigma_k^2}|y_{k,l}|.$$

5. The apparatus of claim 1, wherein the pre-determined function $f$ is $$f(g_k,\theta_k,\sigma_k,y_{k,l})=g_k|y_{k,l}|.$$

6. The apparatus of claim 1, wherein the pre-determined function $f$ is $$f(g_k,\theta_k,\sigma_k,y_{k,l})=|y_{l,k}|^2.$$

7. The apparatus of claim 1, wherein the pre-determined function $f$ is $$f(g_k, \theta_k, \sigma_k, y_{k,l}) = \frac{|g_k|^2}{\sigma_k^2}|y_{k,l}|.$$

8. The apparatus of claim 1, wherein the pre-determined function $f$, is $$f(g_k,\theta_k,\sigma_k,y_{k,l})=|y_{k,l}|.$$

9. A method, comprising:
   receiving, by a correlator, a synchronization signal sample;
   correlating, by the correlator, the synchronization sample with a locally generated primary spreading sequence, wherein the correlator includes an output $y_{l,k}$ that is an $l^{th}$ time instant of a kth synchronization signal block period, and l and k are integers;
   computing, by a combiner array, noise $\sigma_k$, beamforming gain $g_k$, and phase $\theta_k$ for each synchronization signal block in the synchronization sample;
   computing, by the combiner array, a combining function $f$ on results of the correlation of the synchronization signal sample and the noise $\sigma_k$, the beamforming gain $g_k$, and the phase $\theta_k$ for each synchronization signal block in the synchronization signal sample;
   identifying a result of the combining function $f$ as a maximum combining function value if the result of the combining function $f$ is either an initial result of the combining function $f$ or is greater than an immediately preceding result of the combining function $f$;
   if an end of an observation window is not reached, returning to the step of receiving the synchronization signal sample, otherwise, proceeding to the next step; and
   determining, by a selector, that a PSS is detected and a time corresponding to the maximum combining function value is a detection time of the PSS.

10. The method of claim 9, wherein the combining function $f$ is $$f(g_k, \theta_k, \sigma_k, y_{k,l}) = \log\left(I_0\left(\frac{Ng_k}{\sigma_k^2}|y_{k,l}|\right)\right)$$

where $I_0$ is a zero$^{th}$ order of a modified Bessel function and N is an integer representing a length of the PSS.

11. The method of claim 9, wherein the combining function $f$ is $$f(g_k, \theta_k, \sigma_k, y_{k,l}) = \left(\frac{g_k}{\sigma_k^2}|y_{k,l}|\right)^2.$$

12. The method of claim 9, wherein the combining function $f$ is $$f(g_k, \theta_k, \sigma_k, y_{k,l}) = \frac{g_k}{\sigma_k^2}|y_{k,l}|.$$

13. The method of claim 9, wherein the combining function $f$ is $$f(g_k, \theta_k, \sigma_k, y_{k,l}) = g_k|y_{k,l}|.$$

14. The method of claim 9, wherein the combining function $f$ is $$f(g_k, \theta_k, \sigma_k, y_{k,l}) = |y_{l,k}|^2.$$

15. The method of claim 9, wherein the combining function $f$ is $$f(g_k, \theta_k, \sigma_k, y_{k,l}) = \frac{|g_k|^2}{\sigma_k^2}|y_{k,l}|.$$

16. The method of claim 9, wherein the combining function $f$ is $$f(g_k, \theta_k, \sigma_k, y_{k,l}) = |y_{k,l}|.$$

* * * * *

UNITED STATES PATENT AND TRADEMARK OFFICE
CERTIFICATE OF CORRECTION

PATENT NO.        : 10,044,403 B1
APPLICATION NO.   : 15/666275
DATED             : August 7, 2018
INVENTOR(S)       : Bemini Hennadige Janath Peiris et al.

Page 1 of 1

It is certified that error appears in the above-identified patent and that said Letters Patent is hereby corrected as shown below:

In the Claims

In Column 10, Claim 4, the formula "$f(g_k, \theta_k, \sigma_k, y_{k,l}) = \frac{|g_k|^2}{\sigma_k^2}|y_{k,l}|.$" should be
-- $f(g_k, \theta_k, \sigma_k, y_{k,l}) = \frac{g_k}{\sigma_k^2}|y_{k,l}|.$ --

In Column 12, Claim 15, the formula "$f(g_k, \theta_k, \sigma_k, y_{k,l}) = \frac{|g_k|^2}{\sigma_k^2}|y_{k,l}|.$" should be
-- $f(g_k, \theta_k, \sigma_k, y_{k,l}) = \frac{|g_k|^2}{\sigma_k^2}|y_{l,k}|.$ --

Signed and Sealed this
Twenty-second Day of January, 2019

Andrei Iancu
*Director of the United States Patent and Trademark Office*